Dec. 13, 1932.    R. C. SCHUETZ    1,891,208
STEERING GEAR
Filed March 6, 1930   2 Sheets-Sheet 1
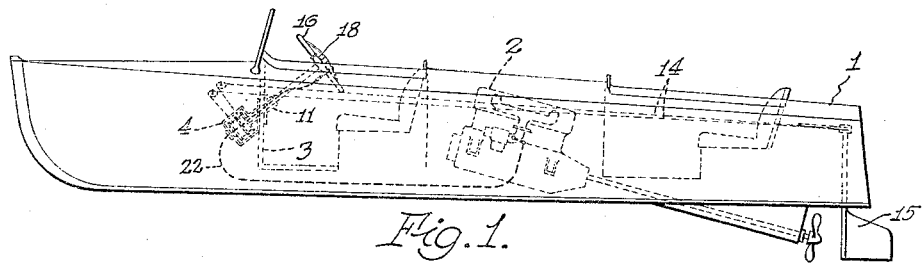
Fig. 1.
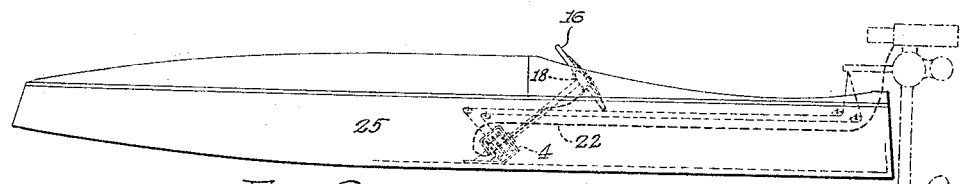
Fig. 2.
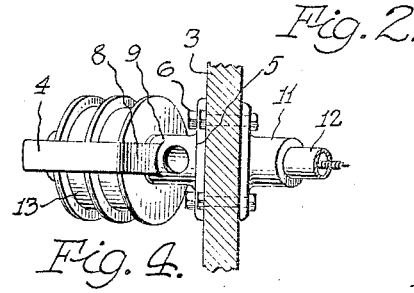
Fig. 4.
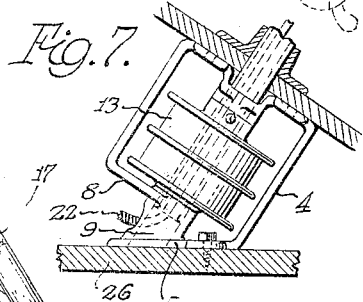
Fig. 7.
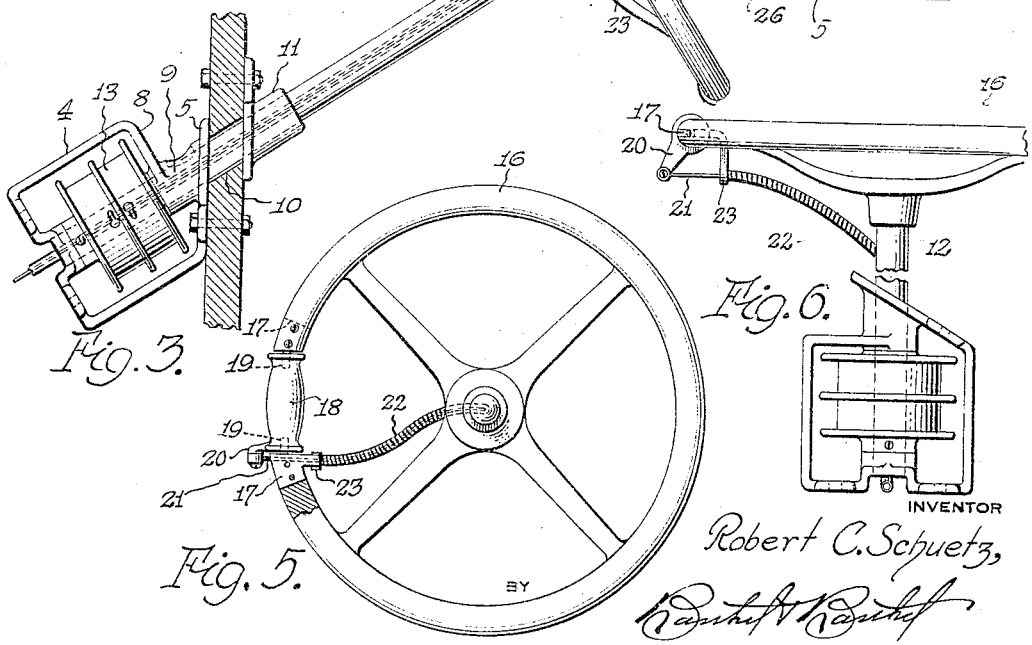
Fig. 3.
Fig. 6.
Fig. 5.
INVENTOR
Robert C. Schuetz,
BY
ATTORNEYS

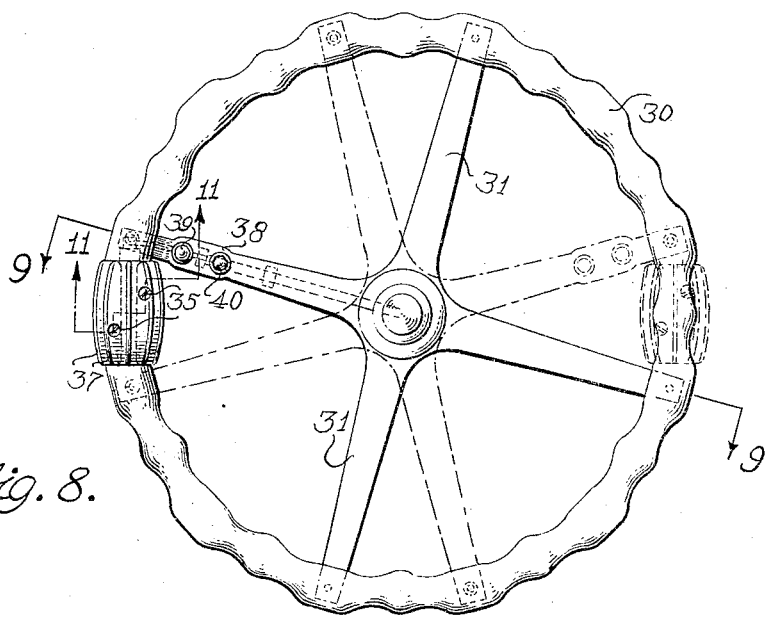
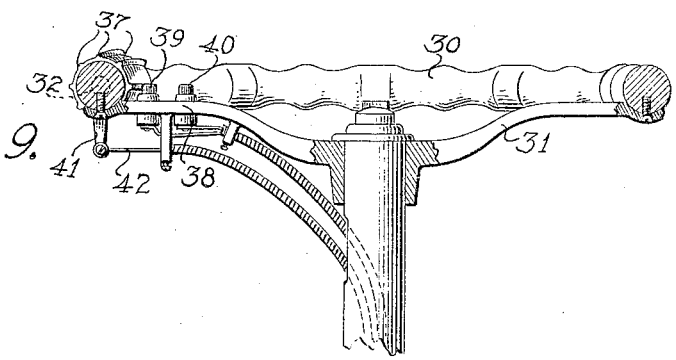
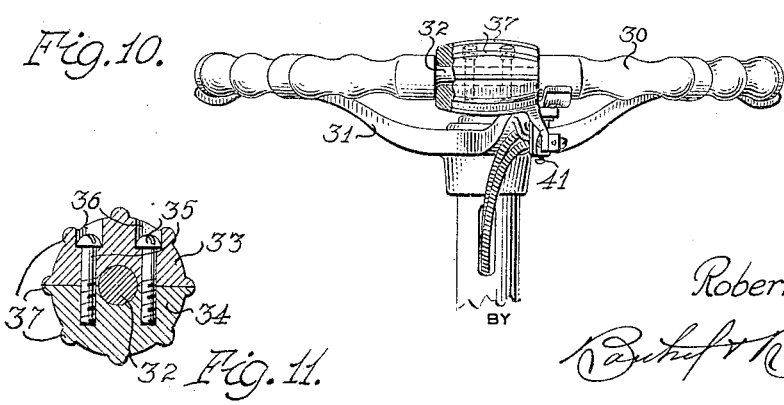

Patented Dec. 13, 1932

1,891,208

UNITED STATES PATENT OFFICE

ROBERT C. SCHUETZ, OF DETROIT, MICHIGAN, ASSIGNOR TO HERMINE SCHUETZ, OF DEXTER, MICHIGAN

STEERING GEAR

Application filed March 6, 1930. Serial No. 433,585.

The present invention pertains to a novel steering gear designed particularly for use in connection with motor boats. In certain classes of boats the steering post is supported in a bearing secured to a vertical dashboard, and in others to a bearing secured to the floorboards. An object of the present invention is to provide a bearing member which may be secured to either the dashboard or the floorboard, and in either position to maintain the steering post at a convenient angle.

Accordingly, the bearing member is formed as a frame having a bracket extending therefrom and forming an acute angle with one of the sides of the frame. The angle formed by the bracket is approximately 45°, so that the bearings carried by the frame member will be disposed at a proper angle for receiving the steering post, whether the bracket be secured to a vertical or a horizontal support.

A further object of the invention is to provide a steering wheel with a movable handle mounted therein for operating the throttle or other device. The handle is preferably rotatable with respect to the rim of the wheel and has a depending arm which is linked to the member to be operated. In the preferred construction, the handle is positioned directly beneath an end of one of the spokes, and this end carries one or more switch buttons for controlling the member to be operated by the handle. In this relative position of the handle and switch buttons, the latter are within the reach of the thumb of the hand which holds the handle. The construction is such that the handle may be mounted on either the righthand or lefthand side of the steering wheel, as preferred, in the same relative position to the switch buttons.

The invention is fully disclosed by way of example in the following description and in the accompanying drawings, in which—

Figure 1 is a side elevation of a motor boat equipped according to the invention;

Fig. 2 is a side elevation of an outboard motor boat equipped according to the invention;

Fig. 3 is a longitudinal vertical section of the device shown in Figure 1, illustrating the steeering gear in elevation;

Fig. 4 is a plan section thereof;

Fig. 5 is a plan view, partly in section, of the steering wheel;

Fig. 6 is an elevation of the steering post with the wheel thereon;

Fig. 7 is a detail longitudinal vertical section of the boat shown in Figure 2, illustrating the lower part of the steering gear in elevation;

Fig. 8 is a plan view of a modified form of steering wheel;

Fig. 9 is a section on the line 9—9 of Figure 8;

Fig. 10 is a side elevation of the wheel, partly in section; and

Fig. 11 is a section on the line 11—11 of Figure 8.

Reference to these views will now be made by use of like characters which are employed to designate corresponding parts throughout.

In Figure 1 is illustrated a motor boat 1 carrying a power plant 2 within the vessel. In the forward end of the boat there is provided a vertical dashboard 3 for supporting the steering post and other apparatus incidental to the operation of the vessel.

To the forward side of the dashboard is supported a pulley frame 4 by means of a bracket 5 extending angularly from one of the sides thereof and secured to the dashboard by means of bolts 6. It will be seen in Figure 3 that the frame 4 is rectangular or substantially square and is formed at one of its sides with a bearing 7. The angular bracket 5 is a continuation of the wall of the frame and forms an acute angle of approximately 45° with the frame side 8 opposite the side in which the bearing 7 is formed.

The bracket 5 is joined to the side 8 by another bearing 9 in line with the bearing 7.

The dashboard 3 is formed with an aperture 10 in line with the bearings 7 and 9, and over the rearward side of the aperture is secured another bearing 11 also in line with the aperture 10 and the first named bearings. A suitable steering post 10 is journalled in the several bearings and carries a double pulley 13 within the frame 4. The steering cable 14 leading to the rudder 15 of the vessel has its ends oppositely wound on the divisions of the pulley 13, so that the adjustment of the rudder may be regulated by turning the post 12 with the pulley 13 thereon.

To the upper end of the post 12 is secured a steering wheel 16 having a segment thereof removed, and inserts 17 secured to the exposed ends of the rim of the wheel. A control handle 18 is fitted into the space between the inserts and is preferably journalled on pintles 19 extending from the inserts. The handle is an integral arm 20 to which is attached one end of a wire 21 which leads to the throttle of the engine 2 as clearly shown in Figure 1. The wire enters the post 12 as shown in Figure 6, and at least the exposed part thereof is encased in a flexible conduit 22, the upper end of which is supported by a bracket 23 extending from one of the inserts 17.

Where no dashboard is provided and the steering post is to be supported from the end of the floor as in the case of the outboard motor boat 25 shown in Figure 2, it is merely necessary to secure the bracket 5 of the frame 4 to the floor 26 of the vessel, as shown in Figure 7. The bearings 7 and 9 will form an acute angle with the plane of the floor, due to the relation of the bracket to the side 8 of the frame which has already been described. The steering post 12 and the double pulley 13 are mounted in the manner already described. It will be seen by reference to Figures 3 and 7 that a different angle is formed in each position of the frame 4, but this angle in each case is approximately 45° in order to provide a convenient angle for the post 12.

In Figures 9 to 11 inclusive is illustrated a control handle adapted for application to either side of the steering wheel to be used by the righthand or the lefthand, as the operator prefers. The wheel comprises a rim 30 supported by spokes 31 and supported in substantially the manner described in connection with Figures 1 to 6. A section of the rim is reduced to a core 32 as shown in Figure 11, and on this core are mounted the sections 33 and 34 of a split handle member. Screws 35 are driven through the section 33 into the section 34 to hold the handle rotatably on the core and have their heads countersunk in the section 33 as indicated by the numeral 36. Both sections are ribbed longitudinally at 37 for gripping purposes.

Whether the handle is assembled on the lefthand side as shown in full lines in Figure 8 or on the righthand side as shown in dotted lines in Figure 8, it is positioned directly beneath the end of one of the spokes 31. This end of the spoke is slightly enlarged at 38 in order to support a pair of switch buttons 39 and 40 for operating certain electrical apparatus associated with the motor, such as the ignition system and the self-starter. In placing these buttons directly above the handle, they are made accessible by the thumb of the hand gripping the handle.

The lower handle section 34 is formed with a depending arm 41 attached to a wire 42 connected to the throttle of the engine as described in connection with Figures 1, 2, 3 and 5.

In changing the handle from the lefthand side to the righthand side, the steering wheel is first adjusted on its post so that the enlarged spoke portion 38 carrying the switch buttons takes the position shown in dotted lines in Figure 8. If the rim 30 directly beneath the enlarged portion 38 in its new position is already reduced to a core formation, the handle sections are readily clamped on the core. Otherwise, the rim may be released from the spokes and shifted to a position where the handle lies directly beneath the enlargement 38, and the rim is then reattached to the spokes.

Although specific embodiments of the invention have been illustrated and described, it will be understood that various alterations in the details of construction may be made without departing from the scope of the invention, as indicated by the appended claim.

What I claim is:—

In control mechanism for the operation of motor boats and the like, and wherein the power plant and rudder are remote from the steering mechanism, the combination with a steering mechanism adapted to be operatively connected to the rudder, said mechanism including a steering post and wheel with the latter of circular contour and having spokes, of means carried by the steering wheel and adapted to be operatively connected with the power plant for controlling operations of the latter, said means including a rotatable gripping member carried by and forming a portion of and completing the wheel rim, said member being positioned immediately adjacent to and in rear of one of the wheel spokes, said member carrying a depending arm movable with the member during rotation of the latter, said arm being adapted to be operatively connected to a power plant element by connections a part of which are located within the steering post, said spoke carrying a depending guiding and supporting element for such connections, and an independent electrical control mechanism for power plant operations, said latter mechanism including a make and break device and connections therefrom leading to the power plant with a portion of the connections also located within the steering post, said make and break device being carried by such spoke adjacent the forward end of the member and in position to be actuated by the thumb of the hand gripping said member.

In testimony whereof I affix my signature.

ROBERT C. SCHUETZ.